(12) United States Patent
Zhu et al.

(10) Patent No.: US 10,264,048 B2
(45) Date of Patent: Apr. 16, 2019

(54) GRAPH FRAMEWORK USING HETEROGENEOUS SOCIAL NETWORKS

(71) Applicant: Microsoft Technology Licensing, LLC, Redmond, WA (US)

(72) Inventors: Qiang Zhu, Sunnyvale, CA (US); Qingbo Hu, Chicago, IL (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 90 days.

(21) Appl. No.: 15/051,579

(22) Filed: Feb. 23, 2016

(65) Prior Publication Data

US 2017/0244778 A1    Aug. 24, 2017

(51) Int. Cl.
*H04L 29/08* (2006.01)
*H04L 29/06* (2006.01)

(52) U.S. Cl.
CPC .............. *H04L 67/02* (2013.01); *H04L 67/10* (2013.01); *H04L 67/22* (2013.01); *H04L 67/306* (2013.01); *H04L 67/42* (2013.01)

(58) Field of Classification Search
CPC ......... H04L 67/02; H04L 67/10; H04L 67/22; H04L 67/306; H04L 67/42
See application file for complete search history.

(56) References Cited

U.S. PATENT DOCUMENTS

| | | | | |
|---|---|---|---|---|
| 7,925,599 B2 * | 4/2011 | Koren | ................ | G06K 9/6215 706/12 |
| 8,180,804 B1 * | 5/2012 | Narayanan | ........ | G06F 17/30867 707/798 |
| 9,049,249 B2 * | 6/2015 | Zhang | ................ | H04L 67/306 |
| 9,271,035 B2 * | 2/2016 | Mei | ................ | G06Q 30/0276 |
| 9,384,571 B1 * | 7/2016 | Covell | ................ | G06T 11/206 |
| 9,501,503 B2 * | 11/2016 | Mitra | ................ | G06F 17/30289 |

(Continued)

FOREIGN PATENT DOCUMENTS

CN      103559320 A     2/2014
WO    WO-2017147157 A1  8/2017

OTHER PUBLICATIONS

"International Application Serial No. PCT/US2017/018887, International Search Report dated May 3, 2017", 2 pgs.

(Continued)

*Primary Examiner* — Blake J Rubin
(74) *Attorney, Agent, or Firm* — Schwegman Lundberg & Woessner, P.A.

(57) ABSTRACT

In an example embodiment, a supervised machine learning algorithm is used to train a communication reply score model based on an extracted first set of features and second set of features from social networking service member profiles and activity and usage information. When a plurality of member search results is to be displayed, for the member identified in each of the plurality of member search results, the member profile corresponding to the member is parsed to extract a third set of one or more features from the member profile, activity and usage information pertaining to actions taken by the members on the social networking service is parsed to extract a fourth set of one or more features, and the extracted third set of features and fourth set of features is inputted into the communication reply score model to generate a communication reply score, which is displayed visually to a searcher.

20 Claims, 9 Drawing Sheets

(56) References Cited

U.S. PATENT DOCUMENTS

| | | | |
|---|---|---|---|
| 2006/0031203 A1* | 2/2006 | Rosenbaum | G06F 17/30958 |
| 2007/0255721 A1* | 11/2007 | Chess | G06Q 10/06 |
| 2009/0192809 A1* | 7/2009 | Chakraborty | G06Q 10/00 |
| | | | 705/348 |
| 2012/0278091 A1 | 11/2012 | Yaseen et al. | |
| 2012/0278321 A1* | 11/2012 | Traub | G06F 17/30657 |
| | | | 707/736 |
| 2013/0097320 A1* | 4/2013 | Ritter | G06Q 10/06 |
| | | | 709/226 |
| 2013/0117278 A1* | 5/2013 | Martens | G06Q 20/4016 |
| | | | 707/748 |
| 2013/0124448 A1* | 5/2013 | Soulie-Fogelman | |
| | | | G06Q 50/01 |
| | | | 706/52 |
| 2014/0115218 A1 | 4/2014 | Philip et al. | |
| 2014/0129420 A1* | 5/2014 | Howe | G06Q 40/02 |
| | | | 705/38 |
| 2014/0143332 A1* | 5/2014 | Garg | H04L 67/306 |
| | | | 709/204 |
| 2014/0214936 A1* | 7/2014 | Abraham | H04W 4/21 |
| | | | 709/204 |
| 2014/0214945 A1 | 7/2014 | Zhang et al. | |
| 2014/0317038 A1* | 10/2014 | Mojsilovic | G06Q 10/00 |
| | | | 706/46 |
| 2014/0337419 A9 | 11/2014 | Zhang et al. | |
| 2015/0100661 A1* | 4/2015 | Heise | H04L 47/125 |
| | | | 709/213 |
| 2015/0113060 A1* | 4/2015 | Wahi | H04L 65/403 |
| | | | 709/204 |
| 2015/0161199 A1* | 6/2015 | Pinko | H04L 67/306 |
| | | | 707/736 |
| 2015/0254371 A1 | 9/2015 | Zhang et al. | |
| 2015/0379409 A1* | 12/2015 | Hu | G06F 17/30247 |
| | | | 706/55 |
| 2016/0055184 A1* | 2/2016 | Fokoue-Nkoutche | |
| | | | G06F 17/30297 |
| | | | 707/809 |
| 2016/0217427 A1* | 7/2016 | Baird | G06Q 10/1053 |
| 2017/0149714 A1* | 5/2017 | Valdivia | H04L 51/16 |
| 2017/0186101 A1* | 6/2017 | Kapoor | G06Q 50/01 |
| 2017/0199927 A1* | 7/2017 | Moore | G06F 17/30303 |
| 2017/0220933 A1* | 8/2017 | Gonguet | G06N 5/02 |

OTHER PUBLICATIONS

"International Application Serial No. PCT/US2017/018887, Written Opinion dated May 3, 2017", 12 pgs.

Shi, Baoxu, et al., "Mining interesting meta-paths from complex heterogeneous information networks", In: Data Mining Workshop (ICDMW), IEEE International Conference, [Online] retrieved from the internet: <http://www3.nd.edu/-tweninge/pubs/SWJCDM_MODAT14.pdf>, (Dec. 14, 2014), 11 pgs.

Sun, et al., "Co-author relationship prediction in heterogeneous bibliographic networks", In Advances in Social Networks Analysis and Mining (ASONAM), International Conference, [Online] retrieved from the internet: <http://www.ccs.neu.edu/home/yzsun/papers/asonam11_pathpredict.pdf>, (Jul. 27, 2011), 11 pgs.

* cited by examiner

GRAPH FRAMEWORK USING HETEROGENEOUS SOCIAL NETWORKS

TECHNICAL FIELD

The present disclosure generally relates to computer technology for solving technical challenges in electronic communications. More specifically, the present disclosure relates to the calculation of a communication reply score for members of an online network.

BACKGROUND

The Internet has given rise to two disparate phenomena: the increase in the presence of social networks, with their corresponding member profiles visible to large numbers of people, and the increase in online business transactions. These online business transactions include not just consumer purchases (business to consumer), but also purchases by businesses (business-to-business). With regard to business-to-business transactions, performing accurate predictions of events involving those companies can be challenging. These problems are known as company-level prediction problems. For example, a first business may be a repeat customer of a second business, but it can be difficult to predict if the first business may elect to stop purchasing from the second business (known as "churn"). This is despite the fact that these company-level prediction problems are often binary in nature (i.e., the result of the prediction is either a yes or a no).

Traditionally company-level prediction problems are solved using machine-learning techniques. Traditional classifiers may be applied to a decision tree using company-level features. The problem with this approach is that the result is hugely dependent on the quantities of the training data. If a prediction is attempted for a million businesses, training on data of only a thousand businesses we know have churned (and can be labeled as "churners") leads to inaccurate predictions. Thus, the machine learning techniques are not scalable, at least insofar as the training data also is not scalable. Additionally, the features used in such techniques are independent to the company being examined. This ignores relationships to other companies and relationships between employees.

BRIEF DESCRIPTION OF THE DRAWINGS

Some embodiments of the technology are illustrated, by way of example and not limitation, in the figures of the accompanying drawings.

DETAILED DESCRIPTION

Overview

The present disclosure describes, among other things, methods, systems, and computer program products that individually provide functionality for speeding data access. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

In an example embodiment, a prediction for an entity is calculated by first modeling connections between entities as a heterogeneous network of nodes. A heterogeneous network of nodes is one in which there are a plurality of different node types and a plurality of different connection types. Then, meta-paths are defined to connect related entities. The weights of the meta-paths are calculated. Then the weights of different meta-paths are combined to generate an entity-only graph. A label propagation algorithm is then run on the entity-only graph to obtain prediction results.

Figure 1:
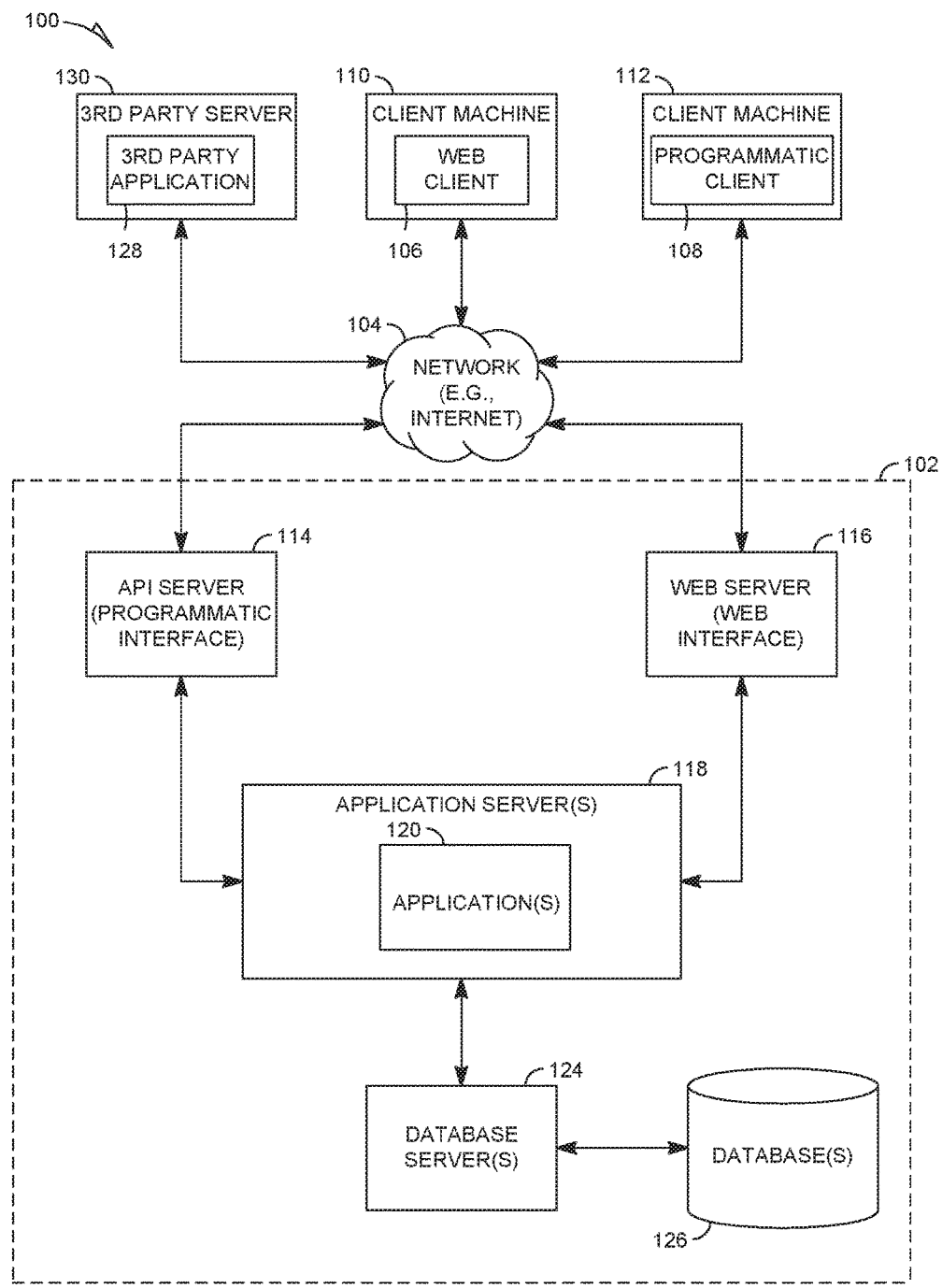
FIG. 1 is a block diagram illustrating a client-server system, in accordance with an example embodiment.

FIG. 1 is a block diagram illustrating a client-server system 100, in accordance with an example embodiment. A networked system 102 provides server-side functionality via a network 104 (e.g., the Internet or a wide area network (WAN)) to one or more clients. FIG. 1 illustrates, for example, a web client 106 (e.g., a browser) and a programmatic client 108 executing on respective client machines 110 and 112.

An application program interface (API) server 114 and a web server 116 are coupled to, and provide programmatic and web interfaces respectively to, one or more application servers 118. The application server(s) 118 host one or more applications 120. The application server(s) 118 are, in turn, shown to be coupled to one or more database servers 124 that facilitate access to one or more databases 126. While the application(s) 120 are shown in FIG. 1 to form part of the networked system 102, it will be appreciated that, in alternative embodiments, the application(s) 120 may form part of a service that is separate and distinct from the networked system 102.

Further, while the client-server system 100 shown in FIG. 1 employs a client-server architecture, the present disclosure is, of course, not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the application(s) 120 via the programmatic interface provided by the API server 114.

FIG. 1 also illustrates a third party application 128, executing on a third party server 130, as having programmatic access to the networked system 102 via the programmatic interface provided by the API server 114. For example, the third party application 128 may, utilizing information retrieved from the networked system 102, support one or more features or functions on a website hosted by a third party. The third party website may, for example, provide one or more functions that are supported by the relevant application(s) 120 of the networked system 102.

In some embodiments, any website referred to herein may comprise online content that may be rendered on a variety of devices including, but not limited to, a desktop personal computer (PC), a laptop, and a mobile device (e.g., a tablet computer, smartphone, etc.). In this respect, any of these devices may be employed by a user to use the features of the present disclosure. In some embodiments, a user can use a mobile app on a mobile device (any of the machines 110, 112 and the third party server 130 may be a mobile device) to access and browse online content, such as any of the online content disclosed herein. A mobile server (e.g., API server 114) may communicate with the mobile app and the application server(s) 118 in order to make the features of the present disclosure available on the mobile device.

Figure 2:
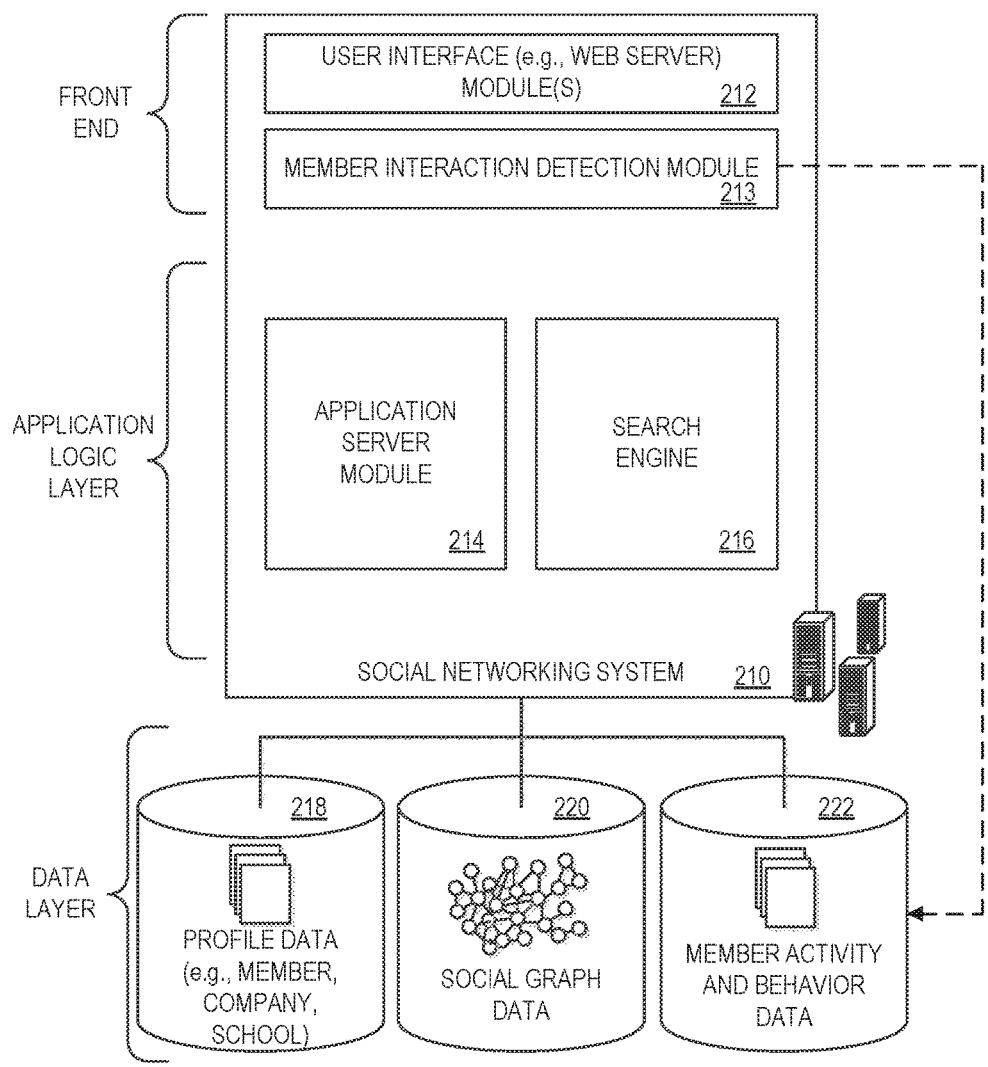
FIG. 2 is a block diagram showing the functional components of a social networking service, including a data processing module referred to herein as a search engine, for use in generating and providing search results for a search query, consistent with some embodiments of the present disclosure.

In some embodiments, the networked system 102 may comprise functional components of a social networking service. FIG. 2 is a block diagram showing the functional components of a social networking service, including a data processing module referred to herein as a search engine 216, for use in generating and providing search results for a search query, consistent with some embodiments of the present disclosure. In some embodiments, the search engine 216 may reside on the application server(s) 118 in FIG. 1. However, it is contemplated that other configurations are also within the scope of the present disclosure.

As shown in FIG. 2, a front end may comprise a user interface module (e.g., a web server 116) 212, which receives requests from various client computing devices, and communicates appropriate responses to the requesting client devices. For example, the user interface module(s) 212 may receive requests in the form of Hypertext Transfer Protocol (HTTP) requests or other web-based API requests. In addition, a member interaction detection module 213 may be provided to detect various interactions that members have with different applications 120, services, and content presented. As shown in FIG. 2, upon detecting a particular interaction, the member interaction detection module 213 logs the interaction, including the type of interaction and any metadata relating to the interaction, in a member activity and behavior database 222.

An application logic layer may include one or more various application server modules 214, which, in conjunction with the user interface module(s) 212, generate various user interfaces (e.g., web pages) with data retrieved from various data sources in a data layer. In some embodiments, individual application server modules 214 are used to implement the functionality associated with various applications 120 and/or services provided by the social networking service.

As shown in FIG. 2, the data layer may include several databases, such as a profile database 218 for storing profile data, including both member profile data and profile data for various organizations (e.g., companies, schools, etc.). Consistent with some embodiments, when a person initially registers to become a member of the social networking service, the person will be prompted to provide some personal information, such as his or her name, age (e.g., birthdate), gender, interests, contact information, home town, address, spouse's and/or family members' names, educational background (e.g., schools, majors, matriculation and/or graduation dates, etc.), employment history, skills, professional organizations, and so on. This information is stored, for example, in the profile database 218. Once registered, a member may invite other members, or be invited by other members, to connect via the social networking service. A "connection" may constitute a bilateral agreement by the members, such that both members acknowledge the establishment of the connection. Similarly, in some embodiments, a member may elect to "follow" another member. In contrast to establishing a connection, the concept of "following" another member typically is a unilateral operation and, at least in some embodiments, does not require acknowledgement or approval by the member that is being followed. When one member follows another, the member who is following may receive status updates (e.g., in an activity or content stream) or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed, commonly referred to as an activity stream or content stream. In any case, the various associations and relationships that the members establish with other members, or with other entities and objects, are stored and maintained within a social graph in a social graph database 220.

As members interact with the various applications 120, services, and content made available via the social networking service, the members' interactions and behavior (e.g., content viewed, links or buttons selected, messages responded to, etc.) may be tracked, and information concerning the members' activities and behavior may be logged or stored, for example, as indicated in FIG. 2, by the member activity and behavior database 222. This logged activity information may then be used by the search engine 216 to determine search results for a search query.

In some embodiments, the databases 218, 220, and 222 may be incorporated into the database(s) 126 in FIG. 1. However, other configurations are also within the scope of the present disclosure.

Although not shown, in some embodiments, the social networking service system 210 provides an API module via which applications 120 and services can access various data and services provided or maintained by the social networking service. For example, using an API, an application may be able to request and/or receive one or more navigation recommendations. Such applications 120 may be browser-based applications 120, or may be operating system-specific. In particular, some applications 120 may reside and execute (at least partially) on one or more mobile devices (e.g., phone or tablet computing devices) with a mobile operating system. Furthermore, while in many cases the applications 120 or services that leverage the API may be applications 120 and services that are developed and maintained by the entity operating the social networking service, nothing other than data privacy concerns prevents the API from being provided to the public or to certain third parties under special arrangements, thereby making the navigation recommendations available to third party applications 128 and services.

Although the search engine 216 is referred to herein as being used in the context of a social networking service, it is contemplated that it may also be employed in the context of any website or online services. Additionally, although features of the present disclosure are referred to herein as being used or presented in the context of a web page, it is contemplated that any user interface view (e.g., a user interface on a mobile device or on desktop software) is within the scope of the present disclosure.

In an example embodiment, when member profiles are indexed, forward search indexes are created and stored. The search engine 216 facilitates the indexing and searching for content within the social networking service, such as the indexing and searching for data or information contained in the data layer, such as profile data (stored, e.g., in the profile database 218), social graph data (stored, e.g., in the social graph database 220), and member activity and behavior data (stored, e.g., in the member activity and behavior database 222). The search engine 216 may collect, parse, and/or store data in an index or other similar structure to facilitate the identification and retrieval of information in response to received queries for information. This may include, but is not limited to, forward search indexes, inverted indexes, N-gram indexes, and so on.

Figure 3:
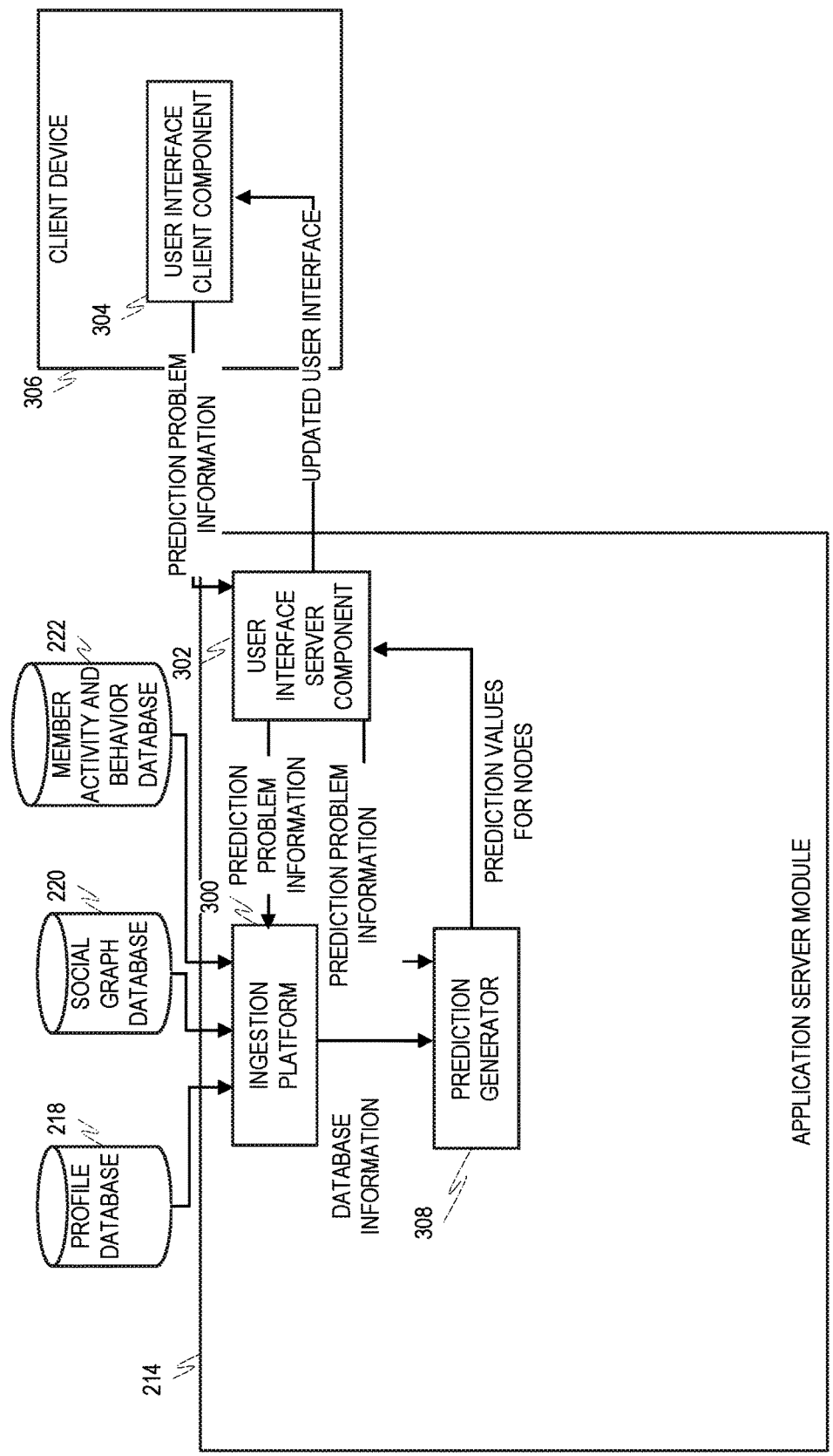
FIG. 3 is a block diagram illustrating an application server module of FIG. 2 in more detail.

FIG. 3 is a block diagram illustrating the application server module 214 of FIG. 2 in more detail. While in many embodiments the application server module 214 will contain many subcomponents used to perform various different actions within the social networking system, in FIG. 3 only those components that are relevant to the present disclosure are depicted. Here, an ingestion platform 300 obtains information from the profile database 218, the social graph database 220, and the member activity and behavior database 222 relevant to a prediction problem identified by a user interface server component 302. The user interface server component 302 communicates with a user interface client component 304 located on a client device 306 to obtain information about the prediction problem. This information is then provided to the ingestion platform 300, which uses this information to obtain relevant information from the databases 218, 220, 222. This database information is then passed to a prediction generator 308. The user interface server component 302 also passes the prediction problem information to the prediction generator 308. Thus, the prediction generator 308 has data available to it from the databases 218, 220, 222 and prediction problem information to perform various operations related to constructing and using a heterogeneous graph framework to solve the prediction problem.

Figure 4:
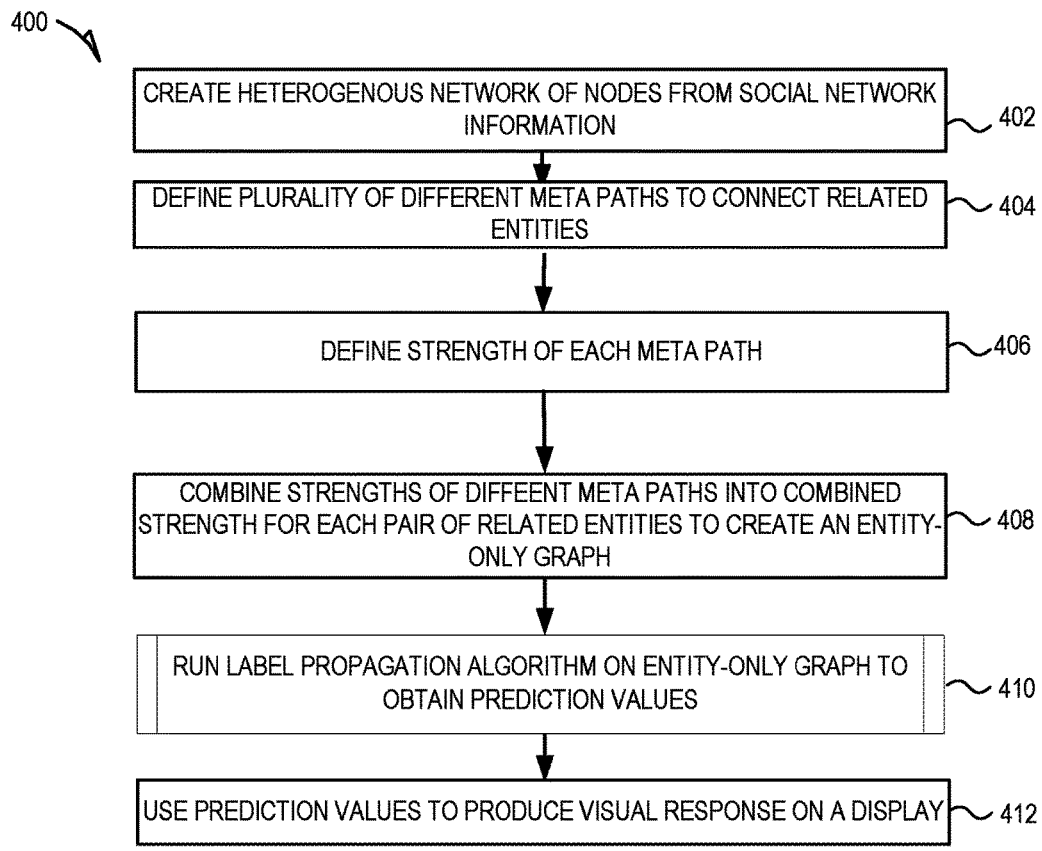
FIG. 4 is a flow diagram illustrating a method of constructing a heterogeneous graph using social network information in order to solve a prediction problem, in accordance with an example embodiment.

FIG. 4 is a flow diagram illustrating a method 400 of constructing a heterogeneous graph using social network information in order to solve a prediction problem, in accordance with an example embodiment. At operation 402, a heterogeneous network of nodes is created from social network information from the databases 218, 220, 222. The heterogeneous network of nodes includes nodes of multiple different types and edges of multiple different types, thus creating potentially multiple different types of paths between nodes of the same type.

Figure 5:
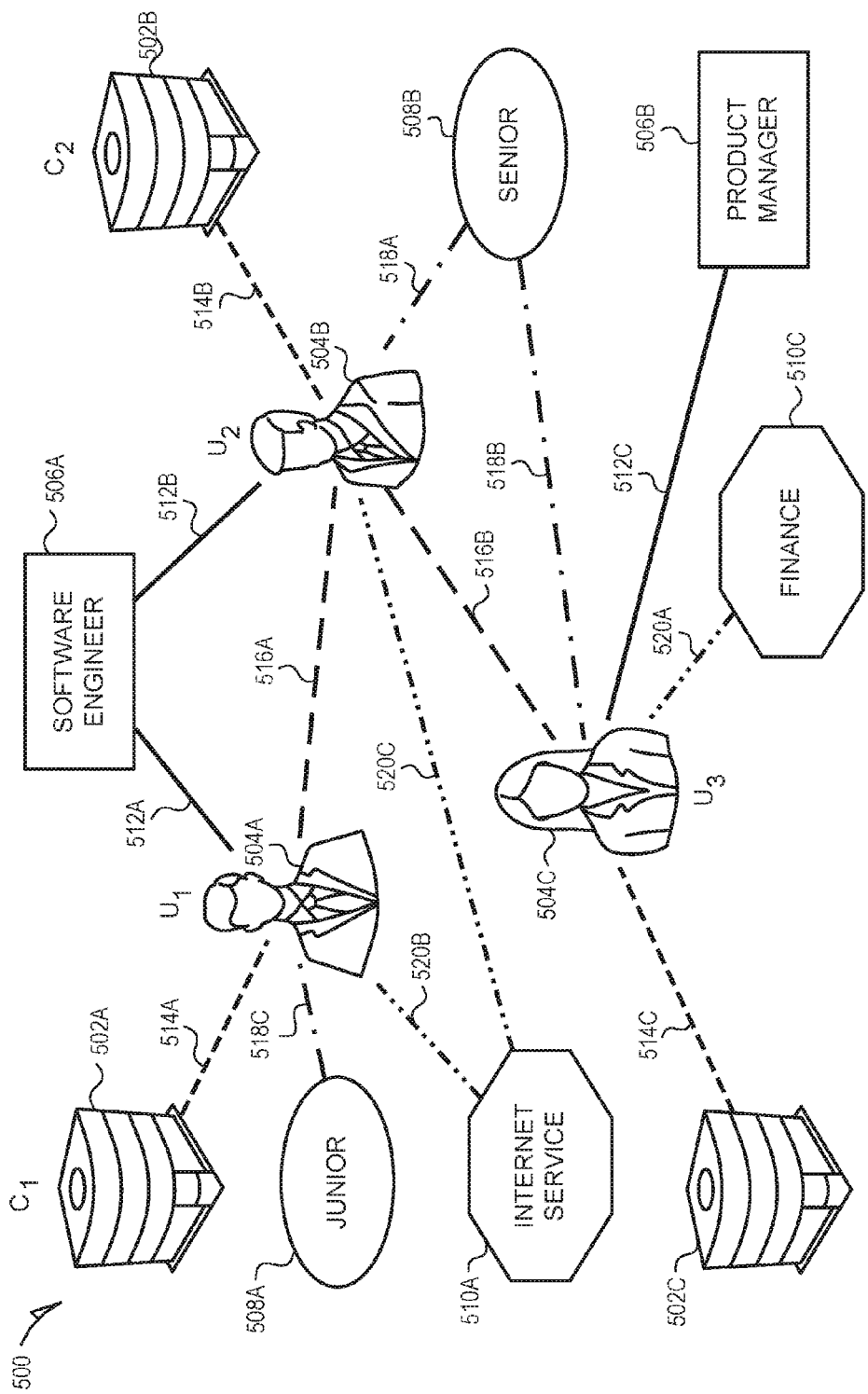
FIG. 5 is a diagram illustrating an example heterogeneous network created for a given problem, in accordance with an example embodiment.

FIG. 5 is a diagram illustrating an example heterogeneous network 500 created for a given problem, in accordance with an example embodiment. The heterogeneous network 500 includes company nodes, including companies 502A, 502B, 502C; user nodes, including users 504A, 504B, 504C; title nodes, including Software Engineer 506A and Product Manager 506B; seniority nodes, including Junior 508A and Senior 508B; and industry nodes, including Internet Service 510A and Finance 510C. Connections (sometimes known as edges) between nodes represent some sort of relationship between the nodes. The connections in this figure are depicted using different styles to represent different types of connections. For example, connection 512A indicates that user 504A has the job title of Software Engineer 506A and may be called a title connection. Connection 512B indicates that user 504B also has the job title of Software Engineer 506A, and connection 512C indicates that user 504C has a job title of Product Manager 506B. Connection 514A indicates that user 504A is an employee of company 502A and may be called an employment edge. Connection 514B indicates that user 504B is an employee of company 502B and connection 514C indicates that user 504C is an employee of company 502C. Connection 516A indicates that user 504A has a social networking relationship with user 504B and thus may be called a social connection edge. Connection 516B indicates that user 504C has a social networking relationship with user 504B. Connection 518A may indicate that user 504B has seniority of "Senior" 508B and thus may be called a seniority edge. Connection 518B may indicate that user 504C has a seniority of "Senior" 508B and connection 518C may indicate that user 504A has a seniority of "Junior" 508A. Connection 520A may indicate that user 504C is in the industry of "Finance" 510C, and thus may be called an industry edge. Connections 520B and 520C may indicate that users 504A and 504B, respectively, are in the industry of Internet Service 510A. Thus, this figure depicts a graph having five different types of connections between nodes, each type of connection meaning a different thing.

The result is that heterogeneous network 500 depicts a relationship between company 502A and company 502B through other nodes and through other types of connections, despite there being no direct company-to-company link between company 502A and 502B. Indeed, there are multiple possible paths between company 502A and company 502B.

It should be noted that this type of graph can be used to represent multiple different types of entities in different ways. In that manner, there may be many different types of nodes (not just the five depicted here), as well as many different connection types (not just the five depicted here). The concepts of the present disclosure will work with any heterogeneous network of nodes.

After the construction of this heterogeneous network 500 of nodes, meta-path types to connect related entities are defined. Referring back to FIG. 4, at operation 404, a plurality of different meta-path types to connect related entities are defined. Related entities include any entities that the prediction problem wishes to examine. For example, if the prediction problem wants to determine the likelihood that various companies will purchase items from a first company, the meta-paths defined can be a plurality of different meta-paths between the first company and each of those various companies. In an example embodiment, the related entities are all nodes of the same type, as defined in the heterogeneous network of nodes. For example, the nodes may all be businesses, or all be users, or all be job titles, etc.

A meta-path in a heterogeneous network of nodes refers to a sequence of node and edge types defined based on a network schema. Each of the meta-path types include combinations of different edge types. For the example in FIG. 5, for instance, five different meta-path types for connection between company 502A and company 502B may be defined, one for each connection type. While the meta-path types may include sequences of multiple connection types, one of the connection types will be considered the primary connection type for the meta-path type. For example, in FIG. 5, a first meta-path may be a social path, which connects the companies 502A, 502B using a social connection edge (as well as employment edges).

Here, the social path may be Company(node)-Employment(edge)-Employee(node)-Employment(edge)-Company (node), or in terms of the example of the figure, company 502A through employment edge 514A, through user 504A, through social connection edge 516A, through user 504B, through employment edge 514B, to company 502B.

A title homophily path may be Company(node)-Employment(edge)-Employee(node)-HasTitle(edge)-Title(node)-HasTitle(edge)-Employee(node)-Employment(edge)-Company(node), or in terms of the example of the figure, company 502A through employment edge 514A, through user 504A, through title edge 512A, through Software Engineer 506A, through title edge 512B, through user 504B, through employment edge 514B, to company 502B.

A seniority homophily path may be Company(node)-Employment(edge)-Employee(node)-HasSeniority(edge)-Seniority(node)-Seniority(edge)-Employee(node)-Employment(edge)-Company(node). In terms of the example of FIG. 5, there is actually no seniority homophily path connecting company 502A and company 502B, but there is one connecting company 502B and company 502C, which is company 502B through employment edge 514B, through user 504B, through seniority edge 518A, through Senior 508B, through seniority edge 518B, through user 504C, through employment edge 514C, to company 502C.

An industry homophily path may be Company(node)-Employment(edge)-Employee(node)-HasIndustry(edge)-Industry(node)-HasIndustry(edge)-Employee(node)-Employment(edge)-Company(node), or in terms of the example of the figure, company 502A through employment edge 514A, through user 504A, through industry edge 520B, through Internet Service 510A, through industry edge 520C, through user 504B, through employment edge 514B, to company 502B.

An additional special case can occur where companies have a direct link, in which case the path contains only nodes for the companies.

At this point, the meta-path types for each pair of relevant entities may each be assigned a strength. At operation 406, the strengths of the meta-path types are defined. A strength is defined for each type of meta-path. For each meta-path type that does not directly connect two companies (i.e., the first four meta-path types described above), the strength for a meta-path type connecting $C_i$ and $C_j$ (denoted as $W_{i,j}^{MP}$ is calculated as:

$$W_{i,j}^{MP} = \frac{2 \times |\{p_{i,j}: p_{i,j} \in MP\}|}{|\{p_{i,i}: p_{i,i} \in MP\}| + |\{p_{j,j}: p_{j,j} \in MP\}|}$$

$\{p_{i,j}:p_{i,j} \in MP\}$ denotes the set of path instances of one meta-path type MP, of which the company nodes at two ends are $C_i$ and $C_j$.

$|*|$ refers to the total number of instances in a set.

This bases the strength of the meta path type on the number of paths, of the meta-path type, between two nodes, with some normalization to, for example, account for companies with large number of employees or other nodes connected to the company that is not related to the strength of the connection.

For the special meta-path type which doesn't include any edges and contains only two nodes $C_i$ and $C_j$ (the last example meta-path type described above), the strength is calculated as:

$$W_{i,j} = \exp\left(-\frac{\|f_i - f_j\|^2}{\sigma^2}\right)$$

$\|*\|$ denotes $l_2$ norm is a scaling factor that could be decided by cross-validation.

$f_x$ denotes the features for company $C_x$. Such features are commonly used by traditional prediction algorithms and can vary by domains and applications.

Notably $f_x$ is a vector of one or more features. The above formula weights all of these features equally. In some example embodiments, different weightings may be applied to the features to allow some features to be more of an influence on the output score than other features.

Referring back to FIG. 4, at operation 408, the strength of different meta-path types is combined for each pair of related entities to generate an entity-only graph. An entity-only graph is one where the nodes are only of the type for which the prediction problem is being applied. For example, this may be the node type of the "related entities" from operation 404. Thus, if the prediction problem relates to whether companies will purchase from one another, the node types are company nodes. As to the combined strength, if, for example, there are N different types of meta-path, then there are N strengths between two companies. A unified strength is generated by combining all of them as follows:

$$W_{i,j} = \frac{1}{1 + \exp(-a \cdot w_{i,j}^T + \epsilon)}$$

$w_{i,j}^1, w_{i,j}^2 \ldots w_{i,j}^N$), which are N weights for N types of meta-path $a=(a_1, a_2 \ldots a_N)$, which are parameters for each weight $a$ and $\in$ can be learnt through Maximum Likelihood Estimation (NILE) based on the training data The result is an entity-only graph (here, for example, all nodes represent companies, although in some example embodiments some other type of node may be used if solving a problem for a different entity than a company), with edges between the nodes each containing the combined strength as calculated above.

Figure 6:
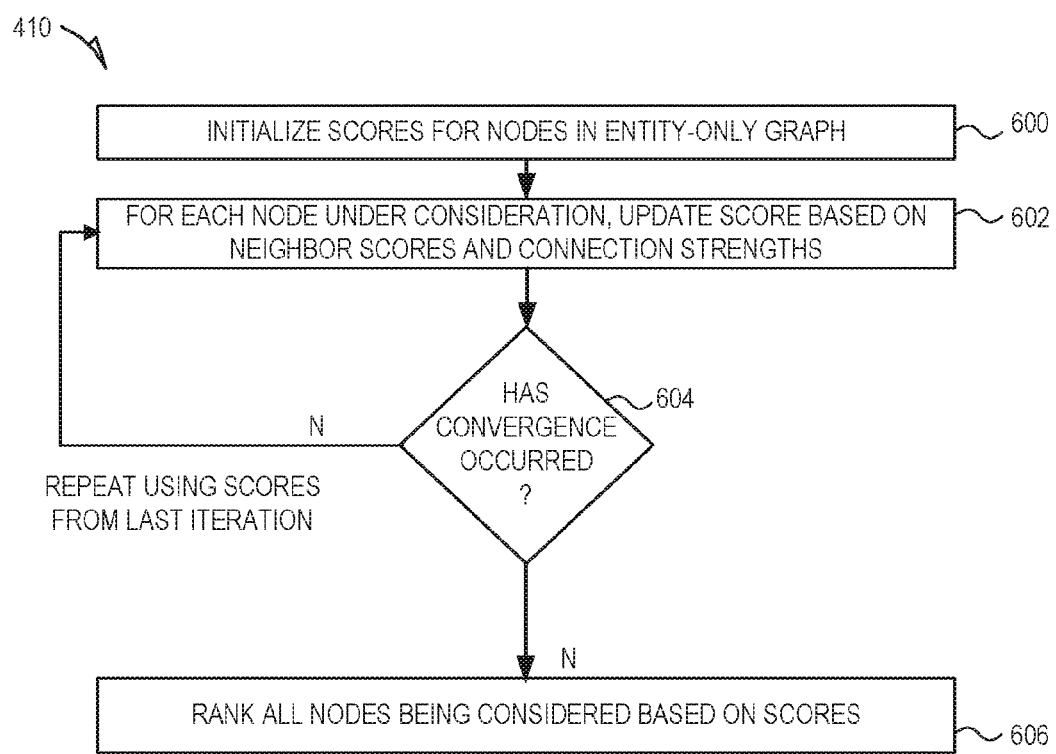
FIG. 6 is a flow diagram illustrating a label propagation algorithm in accordance with an example embodiment.

Referring back to FIG. 4, at operation 410, a label propagation algorithm is run on the company-only graph to obtain prediction results. FIG. 6 is a flow diagram illustrating a label propagation algorithm 410 in accordance with an example embodiment. The label propagation algorithm 410 will act to assign and recalculate scores for each node for which a prediction may be made. Thus, for example, if the problem being predicted is whether or not a particular company will buy goods or services from another company, then a score will be assigned, calculated, and recalculated for each of the particular companies being predicted. At operation 600, scores for each node in the entity-only graph are initialized. This initialization may include, for nodes denoting entities that are deemed to have a positive result to the problem being predicted, a "1" being assigned, whereas for all other nodes (including lost entities and unknown entities), a "0" being assigned. Thus, for example, if the problem being predicted is whether or not a particular company will buy goods or services from another company, a "1" may be assigned to any company nodes representing accounts that have purchased goods or services from the company being examined while a "0" may be assigned to any company nodes representing accounts that have not purchased goods or services from the company being examined (or where the purchasing status is unknown).

At operation 602, for each node under consideration (u), the node's score is updated based on neighbor scores and connection strengths. In an example embodiment, the score for each node is updated using the calculation: Sum ($S_v \times W(u,v)$)/SumW(u,v). $S_v$ is the score assigned to node v, and v belongs to u's neighbor set (a direct neighbor). For nodes where we know the result already, the values can be reset to either 0 or 1 depending on the result in each iteration. Thus, for example, if we know a particular company has purchased goods or services from a company, then the particular company's score will be reset to 1, no matter what the calculated result of the formula. Likewise, if we know a particular company will not purchase goods or services from a company, then the particular company's score will be reset to 0, no matter what the calculated result of the formula. In other words, the score is really only calculated for nodes that we do not already know the result of the prediction.

Because of the fact that, in the first iteration of operation 602, many nodes may not be neighbors with a node having a score greater than 0, operation 602 may be repeated multiple times, until convergence occurs. Thus, at operation 604, it is determined if convergence has occurred. Convergence occurs when the change in score from the most recent iteration of operation 602 for each node is below a preset threshold (i.e., none of the scores have changed more than the preset threshold since the last run). Of course, this means that operation 602 will often need to be performed at least twice so that there is a last iteration to compare to. If convergence has not occurred, then operation 602 is repeated. If convergence has occurred, then the process may proceed to operation 606, where all nodes being examined are ranked based on the score. A node being examined is any node where the prediction is not already known (i.e., any node that has a score other than "0" or "1"). It should also be noted that when the second or later iterations occur, the formula being calculated uses scores from the previous iteration for the calculation. This is in contrast to using, for example, scores assigned to neighboring nodes during the current iteration. In such a way, the ordering in which the values are calculated for the nodes in each iteration is irrelevant.

Figure 7:
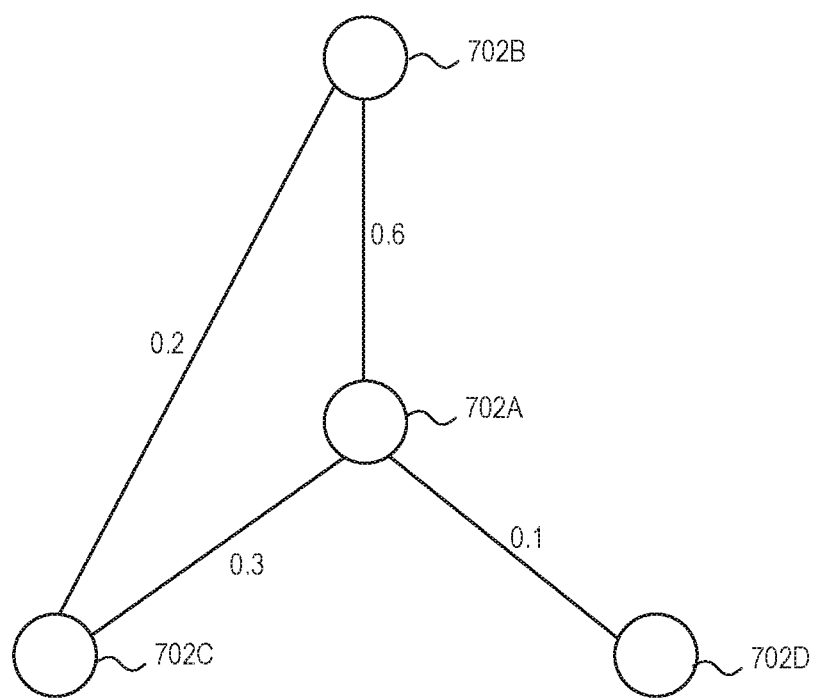
FIG. 7 is an example entity-only graph in accordance with an example embodiment.

FIG. 7 is an example entity-only graph 700 that may be used to illustrate operations 600-606, in accordance with an example embodiment. Specifically, the graph includes nodes 702A-702D, with weights assigned to edges between the nodes 702A-702D. Here, nodes 702A and 702C have labels of unknown for the prediction problem, while node 702B has a positive label and node 702D has a negative label. This may be the case if, for example, a company associated with node 702B purchased items from a particular company while a company associated with node 702D did not, despite having opportunity to. Thus, after operation 600, node 702B is assigned a value of "1" and the remaining nodes assigned a value of "0", thus the vector of scores is [0 1 0 0]. After operation 602, the formula causes the vector to change to [0.6 0 0.4 0], although the 0 for node 702B is reset to 1 because node 702B is a node whose prediction is already known as being positive, resulting in a vector of [0.6 1 0.4 0]. At operation 604, it is determined that convergence has not occurred because the change to the score for node 702A is 0.6 and the change for the score for node 702C is 0.4, both greater than an example threshold of 0.2. Thus, operation 602 repeats, this time producing a vector of [0.72 1 0.76 0]. Since the change to the scores of all the nodes 702A-702D is less than 0.2 (the largest is the change to node 702C, which increased by 0.16), convergence has occurred and the process may proceed to operation 606 where all nodes being considered may be ranked based on the scores in the vector.

Referring back to FIG. 4, the output of operation 410 is a set of prediction values, one for each node being examined (nodes that the prediction is not already known). These prediction values may be between, for example, 0 and 1, with higher values indicating a higher probability that the corresponding node will have a positive result for whatever problem being examined. At operation 412, the prediction values are used to produce a visual response on a display. How these prediction values are used may vary based on implementation. In one example embodiment, the ranked nodes are displayed along with their corresponding scores to a user. In another example embodiment, some threshold of score is used to filter out scores below a particular level and only those nodes above that threshold are displayed to the user. In another example embodiment, the prediction values are used to calculate some other metric relevant to the user and displayed to the user. For example, if the user is a salesperson wanting to know the chances of companies being converted from non-customers to customers, the prediction values may be used in a formula that calculates a conversion percentage. In another example embodiment, the prediction values are used to group nodes into categories (e.g., high likelihood of sale, medium likelihood of sale, low likelihood of sale), and the groups displayed using some visual indicator (e.g., different colors for different groups).

As described briefly above, the types of entities used to construct the entity-only graph may vary based on the prediction problem presented. For example, rather than companies being the entities in the entity-only graph, users or skills may be the entities in the entity-only graph. Indeed, the graph of the heterogeneous network of nodes can be used to solve many different types of prediction problems due to this flexibility.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications, and so forth described in conjunction with FIGS. 1-7 are implemented in some embodiments in the context of a machine and an associated software architecture. The sections below describe representative software architecture(s) and machine (e.g., hardware) architecture(s) that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here, as those of skill in the art can readily understand how to implement the inventive subject matter in different contexts from the disclosure contained herein.

Software Architecture

Figure 8:
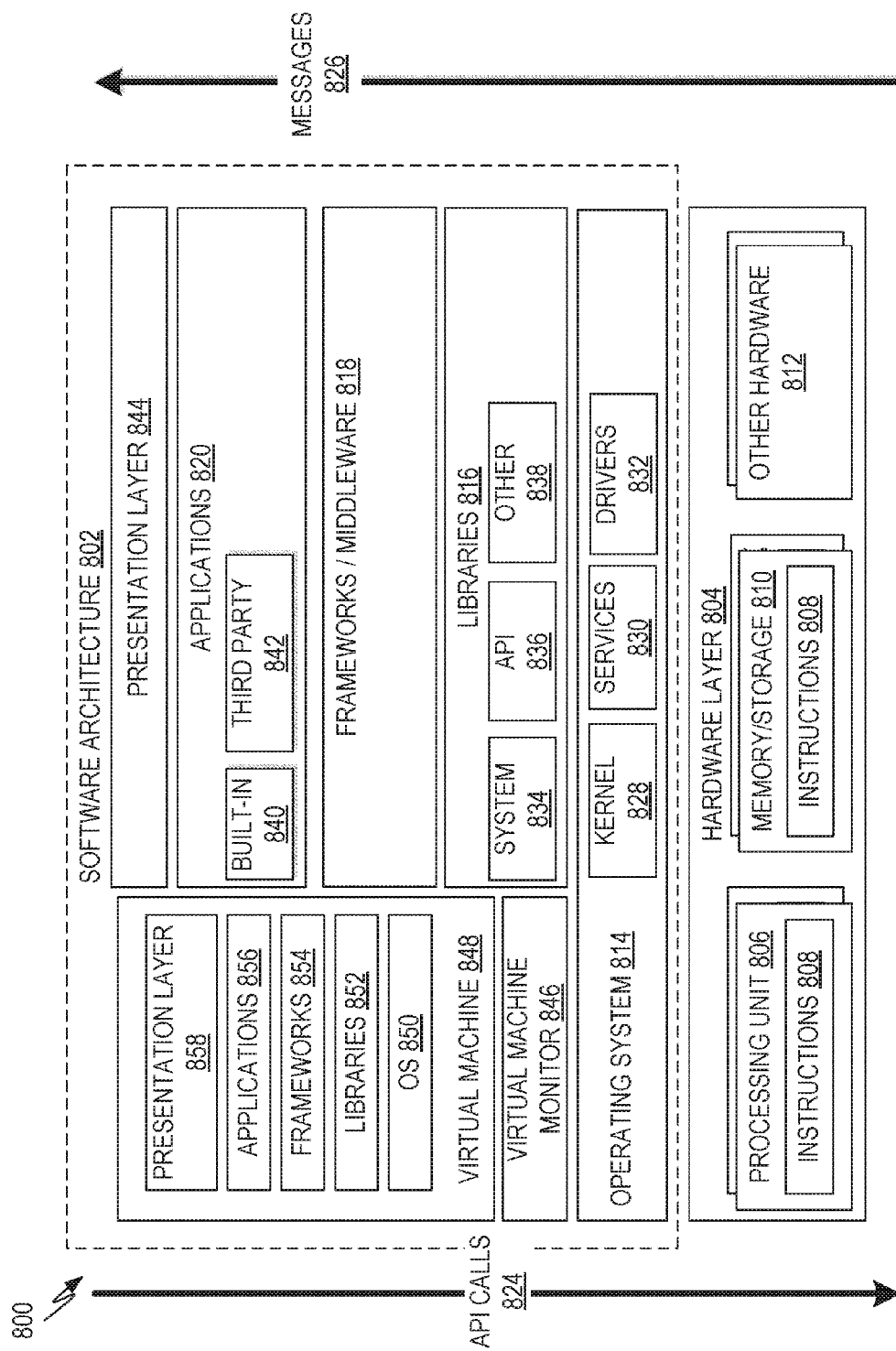
FIG. 8 is a block diagram illustrating a representative software architecture, which may be used in conjunction with various hardware architectures herein described.

FIG. 8 is a block diagram 800 illustrating a representative software architecture 802, which may be used in conjunction with various hardware architectures herein described. FIG. 8 is merely a non-limiting example of a software architecture, and it will be appreciated that many other architectures may be implemented to facilitate the functionality described herein. The software architecture 802 may be executing on hardware such as a machine 900 of FIG. 9 that includes, among other things, processors 910, memory/storage 930, and I/O components 950. A representative hardware layer 804 is illustrated and can represent, for example, the machine 900 of FIG. 9. The representative hardware layer 804 comprises one or more processing units 806 having associated executable instructions 808. The executable instructions 808 represent the executable instructions of the software architecture 802, including implementation of the methods, modules, and so forth of FIGS. 1-7. The hardware layer 804 also includes memory and/or storage modules 810, which also have the executable instructions 808. The hardware layer 804 may also comprise other hardware 812, which represents any other hardware of the hardware layer 804, such as the other hardware illustrated as part of the machine 900.

In the example architecture of FIG. 8, the software architecture 802 may be conceptualized as a stack of layers where each layer provides particular functionality. For example, the software architecture 802 may include layers such as an operating system 814, libraries 816, frameworks/ middleware 818, applications 820, and a presentation layer 844. Operationally, the applications 820 and/or other components within the layers may invoke API calls 824 through the software stack and receive responses, returned values, and so forth, illustrated as messages 826, in response to the API calls 824. The layers illustrated are representative in nature and not all software architectures have all layers. For example, some mobile or special purpose operating systems may not provide a layer of frameworks/middleware 818, while others may provide such a layer. Other software architectures may include additional or different layers.

The operating system 814 may manage hardware resources and provide common services. The operating system 814 may include, for example, a kernel 828, services 830, and drivers 832. The kernel 828 may act as an abstraction layer between the hardware and the other software layers. For example, the kernel 828 may be responsible for memory management, processor management (e.g., scheduling), component management, networking, security settings, and so on. The services 830 may provide other common services for the other software layers. The drivers 832 may be responsible for controlling or interfacing with the underlying hardware. For instance, the drivers 832 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 816 may provide a common infrastructure that may be utilized by the applications 820 and/or other components and/or layers. The libraries 816 typically provide functionality that allows other software modules to perform tasks in an easier fashion than by interfacing directly with the underlying operating system 814 functionality (e.g., kernel 828, services 830, and/or drivers 832). The libraries 816 may include system libraries 834 (e.g., C standard library) that may provide functions such as memory allocation functions, string manipulation functions, mathematic functions, and the like. In addition, the libraries 816 may include API libraries 836 such as media libraries (e.g., libraries to support presentation and manipulation of various media formats such as MPEG4, H.264, MP3, AAC, AMR, JPG, PNG), graphics libraries (e.g., an OpenGL, framework that may be used to render 2D and 3D graphic content on a display), database libraries (e.g., SQLite that may provide various relational database functions), web libraries (e.g., WebKit that may provide web browsing functionality), and the like. The libraries 816 may also include a wide variety of other libraries 838 to provide many other APIs to the applications 820 and other software components/modules.

The frameworks 818 (also sometimes referred to as middleware) may provide a higher-level common infrastructure that may be utilized by applications 820 and/or other software components/modules. For example, the frameworks 818 may provide various graphic user interface (GUI) functions, high-level resource management, high-level location services, and so forth. The frameworks 818 may provide a broad spectrum of other APIs that may be utilized by the applications 820 and/or other software components/modules, some of which may be specific to a particular operating system or platform.

The applications 820 include built-in applications 840 and/or third party applications 842. Examples of representative built-in applications 840 may include, but are not limited to, a contacts application, a browser application, a book reader application, a location application, a media application, a messaging application, and/or a game application. The third party applications 842 may include any of the built-in applications 840 as well as a broad assortment of other applications. In a specific example, the third party application 842 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party applications 842 may invoke the API calls 824 provided by the mobile operating system such as the operating system 814 to facilitate functionality described herein.

The applications 820 may utilize built-in operating system 814 functions (e.g., kernel 828, services 830, and/or drivers 832), libraries 816 (e.g., system libraries 834, API libraries 836, and other libraries 838), and frameworks/middleware 818 to create user interfaces to interact with users of the system. Alternatively, or additionally, in some systems, interactions with a user may occur through a presentation layer, such as the presentation layer 844. In these systems, the application/module "logic" can be separated from the aspects of the application/module that interact with a user.

Some software architectures utilize virtual machines. In the example of FIG. 8, this is illustrated by a virtual machine 848. A virtual machine creates a software environment where applications/modules can execute as if they were executing on a hardware machine (such as the machine 900 of FIG. 9, for example). A virtual machine is hosted by a host operating system (e.g., operating system 814 in FIG. 8) and typically, although not always, has a virtual machine monitor 846, which manages the operation of the virtual machine 848 as well as the interface with the host operating system (e.g., operating system 814). A software architecture executes within the virtual machine 848, such as an operating system 850, libraries 852, frameworks/middleware 854, applications 856, and/or a presentation layer 858. These layers of software architecture executing within the virtual machine 848 can be the same as corresponding layers previously described or may be different.

Example Machine Architecture and Machine-Readable Medium

Figure 9:
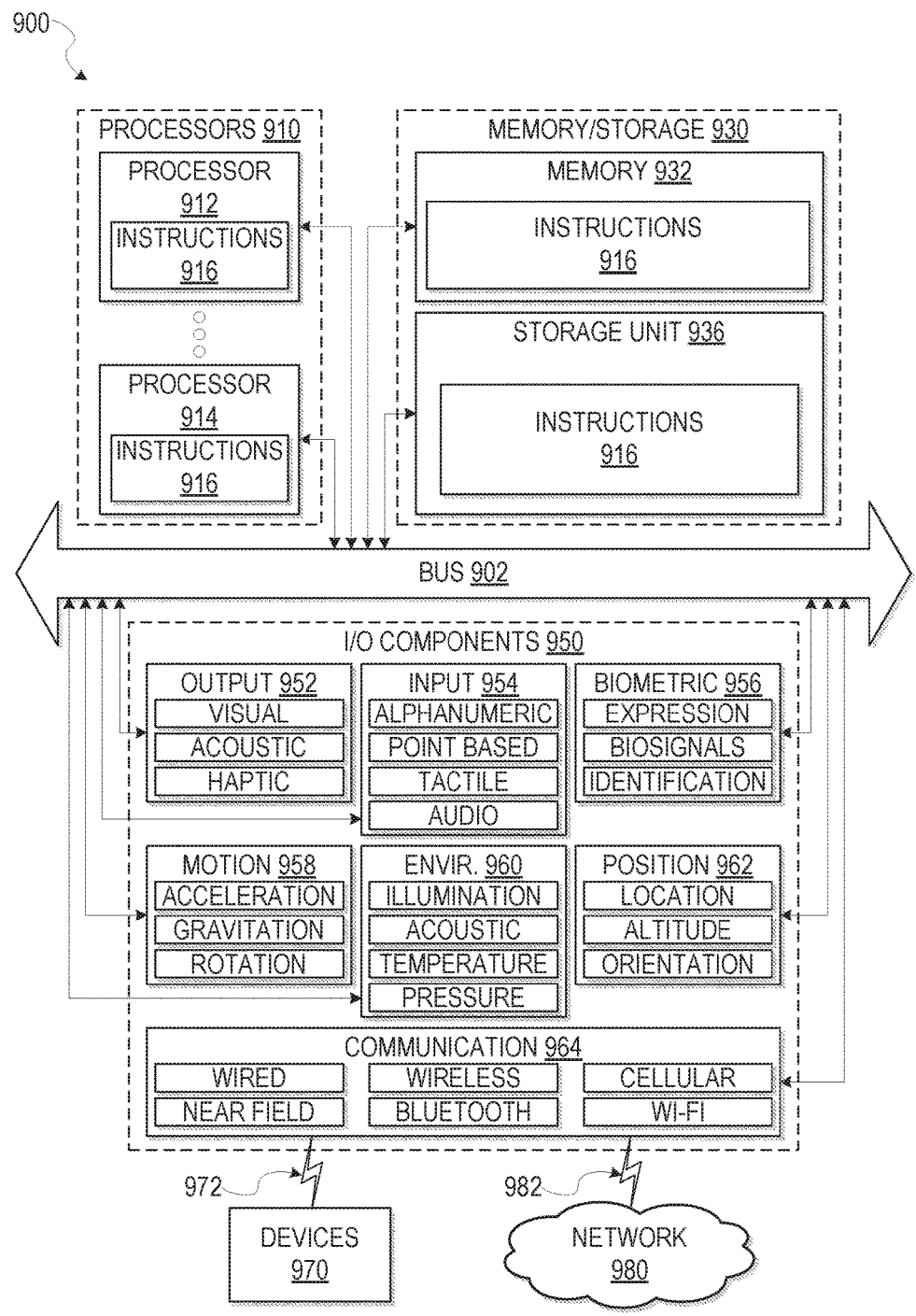
FIG. 9 is a block diagram illustrating components of a machine, according to some example embodiments, able to read instructions from a machine-readable medium (e.g., a machine-readable storage medium) and perform any one or more of the methodologies discussed herein.

FIG. 9 is a Block Diagram Illustrating Components of a Machine 900, according to some example embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. The instructions 916 transform the general, non-programmed machine into a particular machine programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

The machine 900 may include processors 910, memory/storage 930, and I/O components 950, which may be configured to communicate with each other such as via a bus 902. In an example embodiment, the processors 910 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency integrated Circuit (RFIC), another processor, or any suitable combination thereof) may include, for example, a processor 912 and a processor 914 that may execute the instructions 916. The term "processor" is intended to include multi-core processors that may comprise two or more independent processors (sometimes referred to as "cores") that may execute instructions contemporaneously. Although FIG. 9 shows multiple processors 910, the machine 900 may include a single processor with a single core, a single processor with multiple cores (e.g., a multi-core processor), multiple processors with a single core, multiple processors with multiples cores, or any combination thereof.

The memory/storage 930 may include a memory 932, such as a main memory, or other memory storage, and a storage unit 936, both accessible to the processors 910 such as via the bus 902. The storage unit 936 and memory 932 store the instructions 916 embodying any one or more of the methodologies or functions described herein. The instructions 916 may also reside, completely or partially, within the memory 932, within the storage unit 936, within at least one of the processors 910 (e.g., within the processor's cache memory), or any suitable combination thereof, during execution thereof by the machine 900. Accordingly, the memory 932, the storage unit 936, and the memory of the processors 910 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 916. The term "machine-readable medium" shall also be taken to include any medium, or combination of multiple media, that is capable of storing instructions (e.g., instructions 916) for execution by a machine (e.g., machine 900), such that the instructions, when executed by one or more processors of the machine (e.g., processors 910), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 950 may include a wide variety of components to receive input, provide output, produce output, transmit information, exchange information, capture measurements, and so on. The specific I/O components 950 that are included in a particular machine will depend on the type of machine. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion and the grouping is in no way limiting. In various example embodiments, the I/O components 950 may include output components 952 and input components 954. The output components 952 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 954 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 950 may include biometric components 956, motion components 958, environmental components 960, or position components 962, among a wide array of other components. For example, the biometric components 956 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 958 may include acceleration sensor components (e.g., accelerometer), gravitation sensor components, rotation sensor components (e.g., gyroscope), and so forth. The environmental components 960 may include, for example, illumination sensor components (e.g., photometer), temperature sensor components (e.g., one or more thermometers that detect ambient temperature), humidity sensor components, pressure sensor components (e.g., barometer), acoustic sensor components one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 962 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 950 may include communication components 964 operable to couple the machine 900 to a network 980 or devices 970 via a coupling 982 and a coupling 972, respectively. For example, the communication components 964 may include a network interface component or other suitable device to interface with the network 980. In further examples, the communication components 964 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 970 may be another machine or any of a wide variety of peripheral devices (e.g., a peripheral device coupled via a USB).

Moreover, the communication components 964 may detect identifiers or include components operable to detect identifiers. For example, the communication components 964 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 964, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 980 may be an ad hoc network, an intranet, an extranet, a virtual private network (VPN), a local area network (LAN), a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 980 or a portion of the network 980 may include a wireless or cellular network and the coupling 982 may be a Code Division Multiple Access (CDMA) connection, a Global System for Mobile communications (GSM) connection, or another type of cellular or wireless coupling. In this example, the coupling 982 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third. Generation Partnership Project (3GPP) including 3G, fourth generation wireless (4G) networks, Universal Mobile Telecommunications System (UNITS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 916 may be transmitted or received over the network 980 using a transmission medium via a network interface device (e.g., a network interface component included in the communication components 964) and utilizing any one of a number of well-known transfer protocols (e.g., HTTP). Similarly, the instructions 916 may be transmitted or received using a transmission medium via the coupling 972 (e.g., a peer-to-peer coupling) to the devices 970. The term "transmission medium" shall be taken to include any intangible medium that is capable of storing, encoding, or carrying the instructions 916 for execution by the machine 900, and includes digital or analog communications signals or other intangible media to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method for using a heterogeneous network of nodes to solve a prediction problem, the method comprising:
obtaining social network information;
constructing, based at least partially on the social network information, a graph representing a heterogeneous network of nodes, the graph including a plurality of different types of nodes and a plurality of different types of edges between nodes, each different type of node representing a different type of social network information, at least two of the different types of nodes including a first node type corresponding to a first entity identifying an individual or owner associated with a profile and a second node type corresponding to a second entity not identifying an individual or owner associated with a profile;
defining a plurality of different meta-path types, each meta-path type including a different type of edge between nodes;
determining, based on the prediction problem, one or more pairs of nodes to compare;
for each of the one or more pairs of nodes to compare:
assigning a strength to each of the plurality of different meta-path types for the corresponding pair, the strength based on a count of distinct paths of the corresponding meta-path type, in the graph, between the nodes in the corresponding pair; and
combining the strengths assigned to each of the plurality of different meta-path types for the corresponding pair into a unified strength for a connection for the corresponding pair;
constructing an entity-only graph whose nodes represent only the nodes in the one or more pairs of nodes to compare and having edges each assigned the unified strength for the connection for the corresponding pair; and
running a label propagation algorithm on the entity-only graph to solve the prediction problem, the label propagation algorithm assigning scores to each node in the entity-only graph, the scores indicating a likelihood that a corresponding entity will have a positive outcome to a question posed by the prediction problem.

2. The method of claim 1, wherein the one or more pairs of nodes contain only nodes of the same type.

3. The method of claim 1, wherein the assigning a strength includes normalizing the strength based on a number of edges of a single edge type emanating from each of the nodes in the corresponding pair of nodes.

4. The method of claim 1, wherein the combining of strengths includes calculating the unified strength based on the formula $$w_{i,j} = \frac{1}{1 + \exp(-a \cdot w_{i,j}^T + \epsilon)}$$

with $w_{i,j} = (w_{i,j}^1, w_{i,j}^2 \ldots w_{i,j}^N)$, which represent N strengths for N types of meta-path, $a = (a_1, a_2 \ldots a_N)$ which are weighting parameters for each type of meta-path, and wherein $\in$ is a preset value.

5. The method of claim 1, wherein the running of the label propagation algorithm comprises:
initializing scores for each node in the entity-only graph to either 0 or 1,
updating each node, in the entity-only graph, considered for the prediction problem, based on scores assigned to direct neighbor nodes and unified strengths assigned to connections between the corresponding node and each direct neighbor node; and
repeating the updating until scores assigned to each node in the entity-only graph converge from one iteration to the next.

6. The method of claim 5, further comprising ranking the nodes considered for the prediction problem in the entity-only graph based on the scores.

7. The method of claim 5, wherein the scores are considered to have converged when no score changes more than a preset threshold amount from one iteration to the next.

8. A system comprising:
a non-transitory computer-readable medium having instructions stored there on, which, when executed by a processor, cause the system to perform the following operations:
obtaining social network information;
constructing, based at least partially on the social network information, a graph representing a heterogeneous network of nodes, the graph including a plurality of different types of nodes and a plurality of different types of edges between nodes, each different type of node representing a different type of social network information, at least two of the different types of nodes including a first node type corresponding to a first entity identifying an individual or owner associated with a profile and a second node type corresponding to a second entity not identifying an individual or owner associated with a profile;
defining a plurality of different meta-path types, each meta-path type including a different type of edge between nodes;
determining, based on a prediction problem, one or more pairs of nodes to compare;
for each of the one or more pairs of nodes to compare:
assigning a strength to each of the plurality of different meta-path types for the corresponding pair, the strength based on a count of distinct paths of the corresponding meta-path type, in the graph, between the nodes in the corresponding pair;
combining the strengths assigned to each of the plurality of different meta-paths types for the corresponding pair into a unified strength for a connection for the corresponding pair;
constructing an entity-only graph whose nodes represent only the nodes in the one or more pairs of nodes to compare and having edges each assigned the unified strength for the connection for the corresponding pair; and
running a label propagation algorithm on the entity-only graph to solve the prediction problem, the label propagation algorithm assigning scores to each node in the entity-only graph, the scores indicating a likelihood that a corresponding entity will have a positive outcome to a question posed by the prediction problem.

9. The system of claim 8, wherein the one or more pairs of nodes contain only nodes of the same type.

10. The system of claim 8, wherein the assigning a strength includes normalizing the strength based on a number of edges of a single edge type emanating from each of the nodes in the corresponding pair of nodes.

11. T The system of claim 8, wherein the combining of strengths includes calculating the unified strength based on the formula $$W_{i,j} = \frac{1}{1+\exp(-a \cdot w_{i,j}^T + \epsilon)}$$

with $w_{i,j}=(w_{i,j}^1, w_{i,j}^2 \ldots w_{i,j}^N)$, which represent N strengths for N types of meta-path, $a=(a_1, a_2 \ldots a_N)$ which are weighting parameters for each type of meta-path, and wherein $\in$ is a preset value.

12. The system of claim 8, wherein the running of the label propagation algorithm comprises:
    initializing scores for each node in the entity-only graph to either 0 or 1;
    updating each node, in the entity-only graph, considered for the prediction problem, based on scores assigned to direct neighbor nodes and unified strengths assigned to connections between the corresponding node and each direct neighbor node; and
    repeating the updating until scores assigned to each node in the entity-only graph converge from one iteration to the next.

13. The system of claim 12, wherein the operations further comprise ranking the nodes considered for the prediction problem in the entity-only graph based on the scores.

14. The system of claim 12, wherein the scores are considered to have converged when no score changes more than a preset threshold amount from one iteration to the next.

15. A non-transitory machine-readable storage medium comprising instructions which, when implemented by one or more machines, cause the one or more machines to perform operations comprising:
    obtaining social network information;
    constructing, based at least partially on the social network information, a graph representing a heterogeneous network of nodes, the graph including a plurality of different types of nodes and a plurality of different types of edges between nodes, each different type of node representing a different type of social network information, at least two of the different types of nodes including a first node type corresponding to a first entity identifying an individual or owner associated with a profile and a second node type corresponding to a second entity not identifying an individual or owner associated with a profile;
    defining a plurality of different meta-path types, each meta-path type including a different type of edge between nodes;
    determining, based on a prediction problem, one or more pairs of nodes to compare;
    for each of the one or more pairs of nodes to compare:
        assigning a strength to each of the plurality of different meta-path types for the corresponding pair, the strength based on a count of distinct paths of the corresponding meta-path type, in the graph, between the nodes in the corresponding pair;
        combining the strengths assigned to each of the plurality of different meta-paths types for the corresponding pair into a unified strength for a connection for the corresponding pair;
    constructing an entity-only graph whose nodes represent only the nodes in the one or more pairs of nodes to compare and having edges each assigned the unified strength for the connection for the corresponding pair; and
    running a label propagation algorithm on the entity-only graph to solve the prediction problem, the label propagation algorithm assigning scores to each node in the entity-only graph, the scores indicating a likelihood that a corresponding entity will have a positive outcome to a question posed by the prediction problem.

16. The non-transitory machine-readable storage medium of claim 15, wherein the one or more pairs of nodes contain only nodes of the same type.

17. The non-transitory machine-readable storage medium of claim 15, wherein the assigning a strength includes normalizing the strength based on a number of edges of a single edge type emanating from each of the nodes in the corresponding pair of nodes.

18. The non-transitory machine-readable storage medium of claim 15, wherein the combining of strengths includes calculating the unified strength based on the formula $$W_{i,j} = \frac{1}{1+\exp(-a \cdot w_{i,j}^T + \epsilon)}$$

with $w_{i,j}=(w_{i,j}^1, w_{i,j}^2 \ldots w_{i,j}^N)$, which represent N strengths for N types of meta-path, $a=(a_1, a_2 \ldots a_N)$ which are weighting parameters for each type of meta-path, and wherein $\in$ is a preset value.

19. The non-transitory machine-readable storage medium of claim 15, wherein the running of the label propagation algorithm comprises:
    initializing scores for each node in the entity-only graph to either 0 or 1;
    updating each node, in the entity-only graph, considered for the prediction problem, based on scores assigned to direct neighbor nodes and unified strengths assigned to connections between the corresponding node and each direct neighbor node; and
    repeating the updating until scores assigned to each node in the entity-only graph converge from one iteration to the next.

20. The non-transitory machine-readable storage medium of claim 19, further comprising ranking the nodes considered for the prediction problem in the entity-only graph based on the scores.

* * * * *